US006690499B1

(12) United States Patent
Larsen et al.

(10) Patent No.: US 6,690,499 B1
(45) Date of Patent: Feb. 10, 2004

(54) MULTI-STATE LIGHT MODULATOR WITH NON-ZERO RESPONSE TIME AND LINEAR GRAY SCALE

(75) Inventors: Per H. Larsen, Golden, CO (US); James M. Dallas, Superior, CO (US); Rainer M. Malzbender, Niwot, CO (US); Michael R. Meadows, Nederland, CO (US)

(73) Assignee: Displaytech, Inc., Longmont, CO (US)

( * ) Notice: Subject to any disclaimer, the term of this patent is extended or adjusted under 35 U.S.C. 154(b) by 0 days.

(21) Appl. No.: 09/718,843

(22) Filed: Nov. 22, 2000

(51) Int. Cl.[7] .......................... G02B 26/00; G09G 3/36

(52) U.S. Cl. ......................... 359/238; 345/89; 345/101; 345/692; 345/697; 345/204; 345/214; 345/599; 348/671; 355/35

(58) Field of Search ............................ 345/89, 101, 84, 345/77, 80, 589, 596–599, 690, 691, 692, 697, 211–214, 600–602; 348/671; 355/35; 359/238, 315

(56) References Cited

U.S. PATENT DOCUMENTS 5,596,451 A 1/1997 Handschy et al. .......... 359/633
5,731,802 A * 3/1998 Aras et al. .................. 345/692
5,748,164 A 5/1998 Handschy et al. ............ 345/89
5,751,379 A * 5/1998 Markandey et al. ........ 348/759
5,767,828 A * 6/1998 McKnight .................... 345/89
5,969,710 A 10/1999 Doherty et al. ............. 345/148
5,977,940 A * 11/1999 Akiyama et al. ............. 345/94
5,986,640 A * 11/1999 Baldwin et al. ............ 345/596
6,043,801 A * 3/2000 Bassetti ....................... 345/89
6,163,363 A * 12/2000 Nelson et al. ................ 355/32
6,225,991 B1 * 5/2001 McKnight ................... 345/205
6,232,963 B1 * 5/2001 Tew et al. .................. 345/204
6,388,661 B1 * 5/2002 Richards ..................... 345/204
6,428,940 B1 * 8/2002 Sandstrom .................. 430/22

* cited by examiner

*Primary Examiner*—Evelyn Lester
(74) *Attorney, Agent, or Firm*—Gene Branch; Robert G. Crouch; Marsh Fischmann & Breyfogle LLP

(57) ABSTRACT

A multi-state light modulating system having grayscale based on a series of time intervals includes an arrangement that establishes the duration of each time interval such that the time intervals in the series have progressively varying duration. The arrangement also determines a drive signal for each time interval that causes the light modulator to assume a specific light modulating state. The arrangement also causes the light modulator to produce a desired time-averaged light level over the series of time intervals by in part driving the light modulator using the drive signal that corresponds to a particular time interval for a duration that is longer than the duration of the time interval. The arrangement also or alternatively arranges the series of time intervals such that the light modulator is in the same state immediately prior to the particular time interval as the light modulator is in immediately after the time interval.

20 Claims, 9 Drawing Sheets

MULTI-STATE LIGHT MODULATOR WITH NON-ZERO RESPONSE TIME AND LINEAR GRAY SCALE

This invention relates generally to methods for modulating light and more specifically to methods and arrangements for producing modulated light having linear gray scale in light modulating systems with a plurality of states, wherein the response time for the light modulator to modulate between the states may be longer than the duration of at least one of the time periods used to produce a desired gray scale intensity.

BACKGROUND OF THE INVENTION

It is well known that humans viewing successive images within short time intervals may perceive the images as a single or continuous image. For instance, cinematic motion pictures include a series of individual images; however, the individual images appear as a continuous image when viewed in succession above a certain frame frequency. This frequency has been called the critical flicker frequency and in many systems, the critical flicker frequency is roughly 60 hertz. Thus, in most situations, when the time interval for each image in a series is on the order of 1⁄60th of a second, the individual images become indiscernible.

Certain display systems exploit this concept to produce images. For example, consider a display system consisting of an array of pixels, each pixel having only two states, ON and OFF. This type of display system is know as a binary display system. In such a system, the pixels switch between the two states, thus modulating light so as to produce images. Binary display systems are used in a variety of applications, including head-mounted, hand-held, desk-top and projection devices. Consider further that this display system is capable of switching the individual pixels between the two states at frequencies much greater than the critical flicker frequency. If a specific pixel is ON for half of the time and OFF for half of the time and the frequency of modulation is less than the critical flicker frequency, the pixel appears to flash. However, if the pixel modulates between ON and OFF at a frequency greater than the critical flicker frequency, then the pixel appears to be ON continuously, but the intensity appears to be half as great as the intensity if the pixel was in the ON state. Likewise, a pixel that is ON for one-fourth of the time and OFF for three-fourths of the time appears to have one-fourth the intensity of the pixel being always in the ON state, assuming the frequency of modulation is greater than the critical flicker frequency.

This intensity variation in light modulating systems such as the one described above is known as gray scale. The greater the number of different intensities the system is able to produce, the greater the level of gray scale the system is said to have. In order to maximize the number of different intensity levels a system produces, the frame—the time period during which a single image is produced—is typically divided into time segments or slots. In one common example, the duration of each slot is determined such that each slot is twice as long as the next shortest slot, and the total duration of all slots combined is equal to the frame duration. Each slot is then assigned to be either ON or OFF. Thus, if the frame is divided into eight slots of unequal duration as explained above, (e.g., having duration ratios of 1:2:4:8:16:32:64:128), the slots may be assigned ON or OFF in 256 ways ($2^8=256$) to produce 256 unique intensities. Such a system is called an eight-bit gray scale system since the eight slots may be represented by eight binary bits with, for example, a 1 representing the ON state and a 0 representing the OFF state.

The demand to produce systems with more intensities, or greater levels of gray scale, is increasing as display system applications become more pervasive. However, if the system is incapable of modulating between states instantaneously, the speed with which the system switches between states may limit the level of gray scale the system is able to produce. For instance, if the response time—the time the light modulator takes to changes states—is longer than the shortest slot, then the light may not be displayed for the correct amount of time during that slot to produce the desired intensity.

Display systems are not the only systems that encounter the gray scale limitation caused by the light modulating speed. Any multi-state light modulating system that has a non-zero response time to switch between states may experience this restriction. For example, referring initially to FIG. 1, one example of a basic system for modulating light and generally designated by reference numeral 10 is illustrated. Light modulating system 10 includes a light source 12, a light polarizer 14 and a light modulator 16. Light source 12 is configured to direct light 18 toward polarizer 14. Polarizer 14 is configured to pass light of one polarization state, for instance horizontally polarized light (i.e., horizontal with respect to the orientation of the polarizer). Horizontally polarized light H is then directed toward light modulator 16. For this example, light modulator 16 may be any binary light modulating system that has a non-zero response time to switch between states. In the present example, light modulator 16 has an ON state, wherein horizontally polarized light 20 is allowed to pass through to a viewing area 22, and an OFF state, wherein no light passes through to viewing area 22. The state of light modulator 16 is controlled by a drive signal from controller 24. Thus, light modulating system 10 is configured to produce a temporal pattern of light directed toward viewing area 22.

Having generally described the configuration and operation of light modulating system 10, a more detailed method for operating the system will now be described, continuing to refer to FIG. 1. As previously stated, light modulating system 10 is configured to produce a temporal pattern of modulated light directed toward viewing area 22. Depending upon the frequency with which the light is modulated, the pattern may appear to a human viewer as a series of flashes. This would occur, for instance, if the frequency of modulator 16 is less that the critical flicker frequency of the human eye. However, if the frequency is greater than the critical flicker frequency, then modulated light 20 would appear continuous and have an intensity corresponding to the fraction of time that modulator 16 is in the ON state. Thus, light modulating system 10 has the ability to vary the intensity of light 20 directed toward viewing area 22, even though the intensity of light source 12 remains constant.

Light modulating systems such as system 10 and methods for operating them are well known in the art. For example, light modulating system 10 may be a miniature display system of the type disclosed in U.S. Pat. No. 5,596,451, which is incorporated herein by reference. Further, U.S. Pat. No. 5,748,164, which is incorporated herein by reference, discloses several methods for using such a system to produce images having gray scale and/or color. However, as described above, if any slots are deficient—have duration shorter than the response time of the light modulator—the system may not produce the desired intensity when the specific intensity level requires the light to be ON during that slot. Thus, the system may not produce a linear gray scale response. A linear gray scale response occurs when the ratio of any two input signals is equal to the ratio of the output intensities resulting from the two input signals.

For example, consider a four-bit gray scale system, including bits A, B, C, and D, each bit corresponding to a slot. Bit A, the least significant bit (LSB), determines the state (ON or OFF) of the shortest slot and has a time weight of 1; bit D, the most significant bit (MSB), determines the state of the longest slot and has a time weight of 8. The system is capable of providing 16 different intensities ($2^4$=16). Assuming a frame time period of 1⁄60th of a second, or 16.7 milliseconds, the duration of the slots associated with each bit are as follows: Bit A~1.1 milliseconds; Bit B~2.2 milliseconds; Bit C~4.4 milliseconds; and Bit D~8.8 milliseconds. If the light modulator has a response time greater than 1.1 milliseconds, then the system will not properly display all 16 gray scale intensities. The reason for this is explained below.

Referring to FIGS. 2*a–d*, the drive signal and light modulator response for each of the four slots is illustrated for a system that has a response time greater than the LSB. FIG. 2*a* illustrates drive signal 30 and light modulator response 32 for bit D. In this example, drive signal 30 is in the OFF state prior to bit D, and bit D requires the light modulator to be in the ON state. Therefore, at the start 33 of the bit D slot, drive signal 30 transitions from the OFF state to the ON state. The transition in drive signal 30 causes the light modulator, as indicated by light modulator response 32, to begin transitioning from the OFF state to the ON state. The light modulator is not yet completely switched into the ON state for a period of time equal to the response time, indicated by reference numeral 34. In this example, drive signal 30 is in the OFF state after bit D. Therefore, at the end 35 of the bit D slot, drive signal 30 switches from the ON state to the OFF state, causing the light modulator to begin transitioning from the ON state to the OFF state as indicated by light modulator response 32. The light modulator is not yet fully switched into the OFF state until a period of time equal to response time 34 has passed.

Although it may appear that response time 34 would limit the light modulator's ability to produce the desired optical response, this is not the case. The light modulator's optical response as a result of bit D includes the entire period influenced by bit D drive signal 30, not just the light modulator response during the bit D slot. In other words, the optical response as a result of bit D is the integral of light modulator response 32 over the entire period influenced by bit D drive signal 30. This response equals the desired optical response that corresponds to the gray scale intensity represented by bit D being ON. FIGS. 2*b* and 2*c* provide similar illustrations for bits C and B, respectively.

FIG. 2*d* illustrates drive signal 36 for bit A and corresponding light modulator response 38. As indicated by drive signal 36, the desired light modulator state is OFF both before and after the bit A slot. At the beginning 40 of the bit A slot, the drive signal switches to the ON state, at which time the light modulator begins to transition to the ON state, as indicated by light modulator response 38. However, because the light modulator has a response time 34 greater than the duration of the bit A slot, the light modulator is not able to switch completely to the ON state before the end 42 of the bit A slot. Thus, at the end 42 of the bit A slot, the drive signal switches to the OFF state and causes the light modulator to begin transitioning back to the OFF state. In this case, however, the light modulator does not produce the desired optical response, as explained next.

In the three previous cases, the ON delay in the light modulator's response at the end of the slot compensated for the OFF delay at the beginning of the slot. In the present case, the delays essentially overlap in time and the light modulator never reaches the fully ON state. Therefore, even though the delay at the end of the bit A slot partially compensates for the delay at the beginning of the slot, the two segments together are not of sufficient duration to produce the desired optical response. That is, the integral of light modulator response 38 over the period influenced by bit A drive signal 36 is less than the desired optical response that corresponds to the gray scale intensity represented by bit A being ON. Thus, conventional methods of producing gray scale such as this are limited in their ability to correctly produce linear binary gray scale in cases where the LSB slot time is shorter than the light modulator response time.

Referring now to FIGS. 3*a* and *b*, another factor is illustrated that further complicates efforts to produce linear gray scale in a binary system where, for illustration, the LSB slot time is shorter than the light modulator response time. FIGS. 3*a* and *b* illustrate timing diagram 50, drive signal 52 and light modulator response 54 for a case where the LSB, bit A, is positioned in time between bits D and C. In FIG. 3*a* bits D and C have a value of 0, representing the OFF state, while bit A has a value of 1, representing the ON state. As described above with reference to FIG. 2*d*, the light modulator, as indicated by light modulator response 54, is unable to completely transition to the ON state within the bit A slot time. Thus, the integral of the light modulator's response over the period influenced by the bit A drive signal does not produce the desired optical response that corresponds to the gray scale intensity represented by bit A being in the ON state. The integral of the light modulator's optical response in this case is represented by the region designated by reference letter X.

In FIG. 3*b* bit D has a value of 0, while bits C and A have a value of 1, as indicated by drive signal 56. When drive signal 56 reaches the point in time 57 when it represents bit C, the light modulator is still responding to the bit A signal. However, because bits A and C have the same value, the light modulator continues to transition toward the ON state. The integral of the light modulator's response over the period influenced by the bit A drive signal is represented by reference letter Y. Although the LSB, bit A, has the same state in each of FIGS. 3*a* and 3*b*, the integrals of the light modulator's response in each case, X and Y, are not equal. Thus, the light modulator's response to the drive signal for bit A depends on the state of the light modulator before and after bit A. This factor further complicates the ability of conventional methods of producing linear gray scale in binary systems where the LSB slot time is shorter than the light modulator response time.

The present invention overcomes the aforementioned limitations and provides a method of producing light having linear gray scale in multi-state systems where at least one slot is shorter than the light modulator response time.

SUMMARY OF THE INVENTION

As will be described in more detail hereinafter, methods and arrangements for producing modulated light having grayscale are herein disclosed. The method includes providing a light modulator having grayscale based on a series of time intervals and having a plurality of light modulator states. The method also includes establishing the duration of each time interval such that the time intervals in the series have progressively varying duration. The method further includes determining a drive signal for each time interval that causes the light modulator to assume a specific light modulator state. The method further includes causing the light modulator to produce a desired time-averaged light level over the series of time intervals by in part driving the light modulator using the drive signal that corresponds to a particular time interval for a duration that is longer than the duration of the particular time interval, the particular time interval having duration shorter than the response time of the light modulator.

The method may also or alternatively include sensing the temperature of the light modulator and determining the duration by which the drive signal corresponding to the particular time interval exceeds the duration of the particular time interval based in part on the sensed temperature.

The method may also or alternatively include arranging the series of time intervals such that the light modulator is in the same state immediately prior to the particular time interval as the light modulator is in immediately after the particular time interval.

The method may also or alternatively include arranging the time intervals such that the particular time interval immediately follows a first part of a longer one of the time intervals and immediately precedes a second part of the longer time interval.

The method may also or alternatively include reducing the duration of the drive signal corresponding to the longer time interval by an amount of time that is related to the amount of time by which the drive signal corresponding to the particular time interval exceeds the duration of the particular time interval.

In one embodiment of the invention, a light modulator has grayscale based on a series of time intervals. The light modulator also has a plurality of light modulator states. The time intervals have progressively varying duration and each time interval has an associated drive signal that causes the light modulator to assume a specific light modulator state. The light modulator includes a controller that causes the light modulator to produce a desired time-averaged light level over the series of time intervals by in part driving the light modulator using the drive signal that corresponds to a particular time interval for a duration that is longer than the duration of the particular time interval, the particular time interval having duration shorter than the response time of the light modulator.

The light modulator also or alternatively includes a first arrangement that senses the temperature of the light modulator and a second arrangement responsive to the first arrangement that determines the duration by which the drive signal corresponding to the particular time interval exceeds the duration of the particular time interval based in part on the sensed temperature.

The light modulator also or alternatively includes a controller that arranges the series of time intervals such that the light modulator is in the same state immediately prior to the particular time interval as the light modulator is in immediately after the particular time interval.

The light modulator also or alternatively includes a controller for arranging the time intervals such that the particular time interval immediately follows a first part of a longer one of the time intervals and immediately precedes a second part of the longer time interval.

The light modulator also or alternatively includes a controller for reducing the duration of the drive signal corresponding to the longer time interval by an amount of time that is related to the amount of time by which the drive signal corresponding to the particular time interval exceeds the duration of the particular time interval.

The light modulator may be a ferroelectric liquid crystal display. Alternatively, the light modulator may be a nematic liquid crystal display, a plasma display or a micro-mechanical deformable mirror device.

BRIEF DESCRIPTION OF THE DRAWINGS

The features of the present invention may best be understood by reference to the following description of the presently preferred embodiments together with the accompanying drawings.

DETAILED DESCRIPTION

An invention is herein described for producing light having improved gray scale linearity for use in multi-state light modulating systems. This invention may have particular applicability in light modulating systems in which the LSB slot time is shorter than the response time of the light modulator. In the following description, numerous specific details are set forth in order to provide a thorough understanding of the present invention. However, in view of this description, it will be obvious to one skilled in the art that the present invention may be embodied in a wide variety of specific configurations. In order not to unnecessarily obscure the present invention, known manufacturing processes used to produce components such as light modulators, digital control devices and light sources will not be described in detail. Also, the various components which are used in light modulating systems will not be described in detail in order not to unnecessarily obscure the present invention. These other components include, but are not limited to, mirrors, polarizers, beam splitters and lenses. These components are known to those skilled in the art of light modulating systems.

Figure 4:
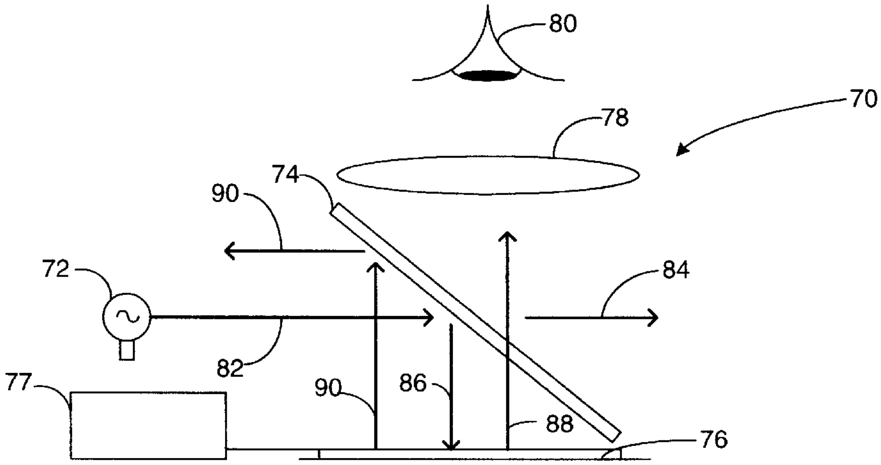
FIG. 4 is a schematic diagram of a reflective spatial light modulator display system.

For illustrative purposes, it will be assumed that the present invention is embodied in the miniature display system of FIG. 4. However, as previously mentioned, the invention is not limited to miniature display systems, or even to display systems generally. A miniature display system similar to the one illustrated in FIG. 4 and designated by reference numeral 70 is fully described in U.S. Pat. No. 5,808,800, which patent is incorporated herein by reference. Display system 70 includes a light source 72, a polarizing beam splitter 74, a reflective spatial light modulator 76, a controller 77, an eyepiece lens 78, and a viewing area 80. Spatial light modulator 76 includes an array of individually controllable pixels, each pixel having two possible optical states, an ON state and an OFF state. Spatial light modulator 76 may be a micro-mechanical deformable mirror device or a liquid crystal device such as, for instance, a ferroelectric liquid crystal modulator or a nematic liquid crystal modulator. Alternatively, spatial light modulator 76 may be a plasma device that modulates light by emitting it, in which case certain components of display system 70 might be unnecessary (e.g., light source 72). By individually switching the pixels in the array of pixels between the two optical states, system 70 produces gray scale images at viewing area 80 in the following way.

Light 82 from light source 72 is direct toward beam splitter 74. Beam splitter 74 is configured to pass light of one polarization state and reflect light of another polarization state. For instance, beam splitter 74 passes p-polarized light 84 (light polarized in the plane of the figure) and reflects s-polarized light 86 (light polarized perpendicular to the plane of the figure). S-polarized light 86 is then directed toward light modulator 76. ON pixels of light modulator 76 convert s-polarized light to p-polarized light and reflect the p-polarized light 88 toward beam splitter 74. OFF pixels do not alter the polarization state of the light and simply reflect s-polarized light 90 back toward beam splitter 74. Beam splitter 74 passes p-polarized light 88 through to lens 78 and reflects s-polarized light 90. Lens 78 then focuses p-polarized light 88, thus creating an image at viewing area 80.

Individual pixels are driven with a sequence of binary data representing a desired intensity level. The sequence causes the pixel to be turned ON and OFF to achieve the desired intensity or gray scale level. Because this is done on a pixelated basis, the individual pixels form patterns of modulated light that appear as gray scale images if the frame rate is above the critical flicker frequency. Thus, by switching individual pixels between ON and OFF states in a temporal relationship in accordance with a gray scale data sequence, display system 70 produces spatial patterns of modulated light that form gray scale images. A typical binary data sequence is described below.

Figure 1:
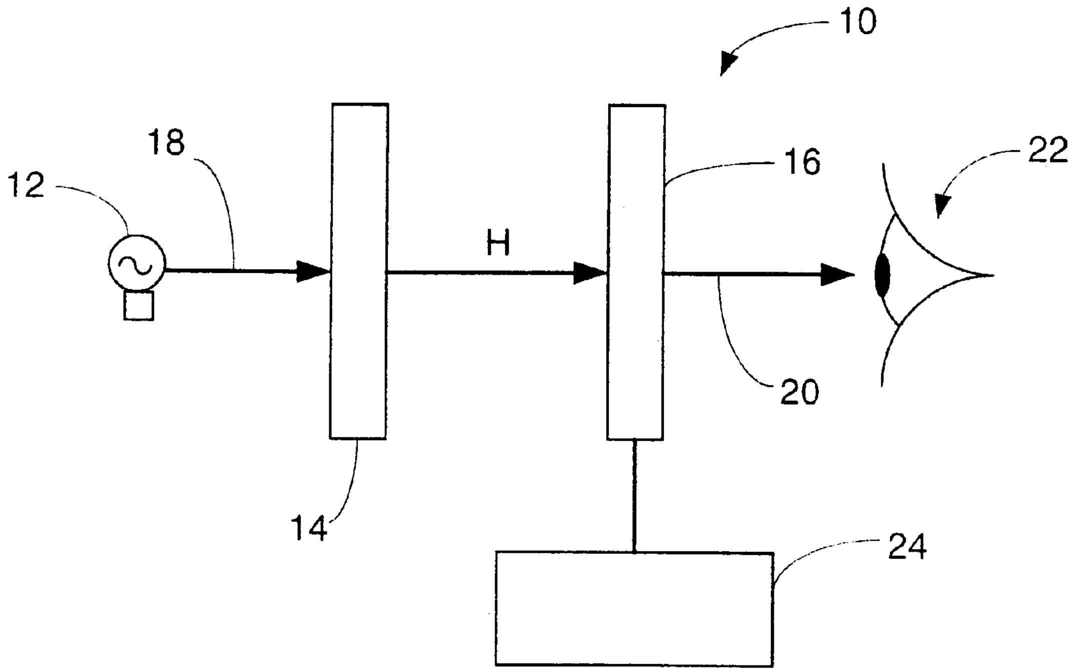
Figure 1 Prior Art
FIG. 1 is a schematic diagram of a transmissive spatial light modulator system.
Figure 2A:
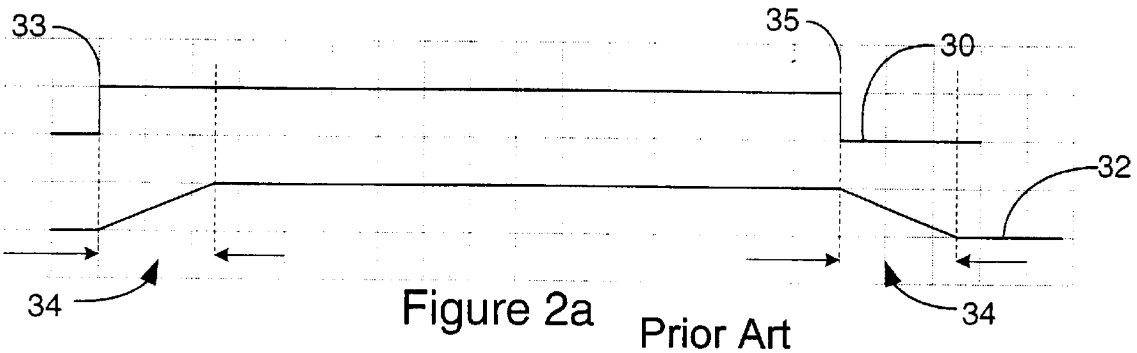
Figure 2a Prior Art
FIGS. 2*a–d* are timing diagrams illustrating the relationship between drive signal and light modulator response in exemplary light modulating systems that have a non-zero response time.
Figure 2B:
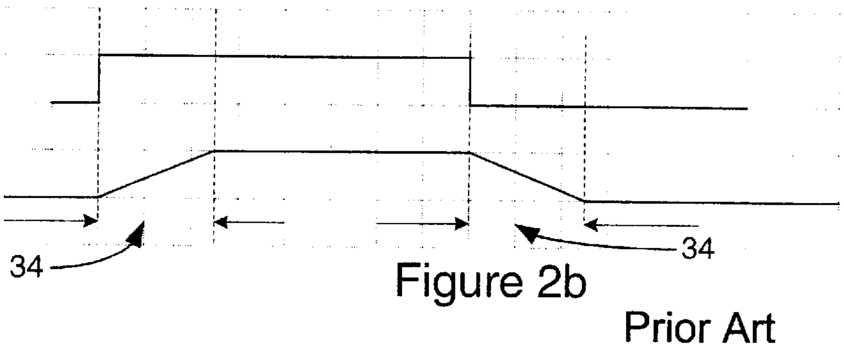
Figure 2b Prior Art
Figure 2C:
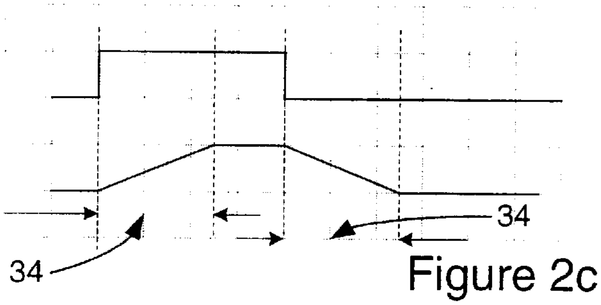
Figure 2c Prior Art
Figure 2D:
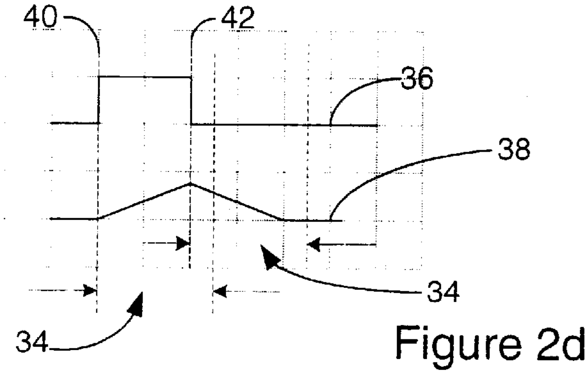
Prior Art Figure 2d
Figure 5:
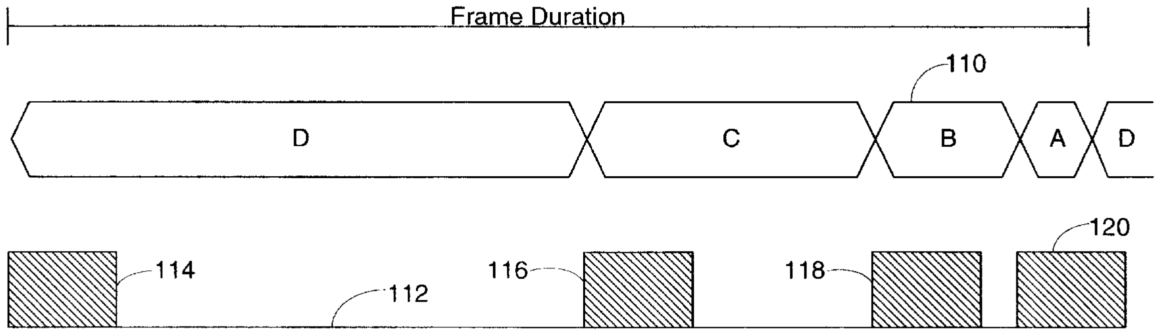
FIG. 5 is a timing diagram illustrating the relationship in time between slots within a frame and the period during which the light modulator is responding to the transition between slots.

FIG. 5 illustrates a drive signal timing diagram 110 for one pixel of one frame in a four-bit binary system as described above with reference to FIG. 1. In addition, FIG. 5 illustrates a light modulator response timing diagram 112 indicating the time periods where the light modulator is in a transitioning state in response to transitions between bits, i.e., the non-zero response time. In timing diagram 110 the bits are displayed within the frame in sequence from the most significant bit (longest slot time), D, to the least significant bit (shortest slot time), A. As can be seen from time periods 114, 116, and 118, representing the light modulator's response time during slots D, C, and B, respectively, the light modulator completes its response prior to the end of each slot. However, as can be seen from response time period 120, which corresponds to slot A in light modulator response timing diagram 112, the light modulator does not respond fast enough for the bit A slot. As can be seen, response time period 120 is longer than the bit A slot, even extending into the bit D slot of the subsequent frame. Therefore, because the light modulator's response time is longer than the duration of at least one slot, the system will not produce the desired optical response for all gray scale intensities, as was described previously with reference to FIGS. 2*a–d*. That is, the optical response will be proportional to the corresponding slots making up the gray scale intensity for some, but not all, gray scale intensities, and thus the overall optical response will not be linear.

Figure 3A:
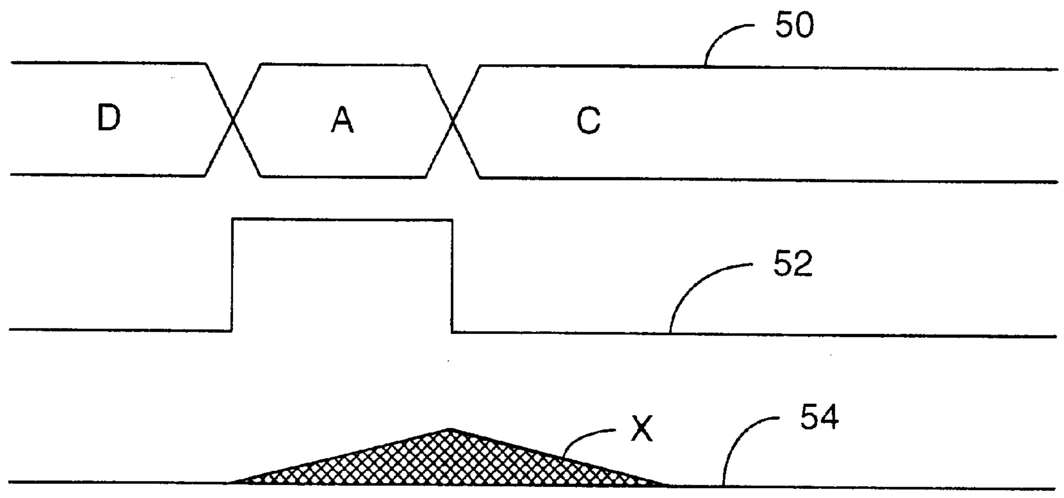
Figure 3a Prior Art
FIGS. 3*a* and 3*b* are timing diagrams illustrating the relationship between drive signal and light modulator response for two specific drive signal data arrangements.
Figure 3B:
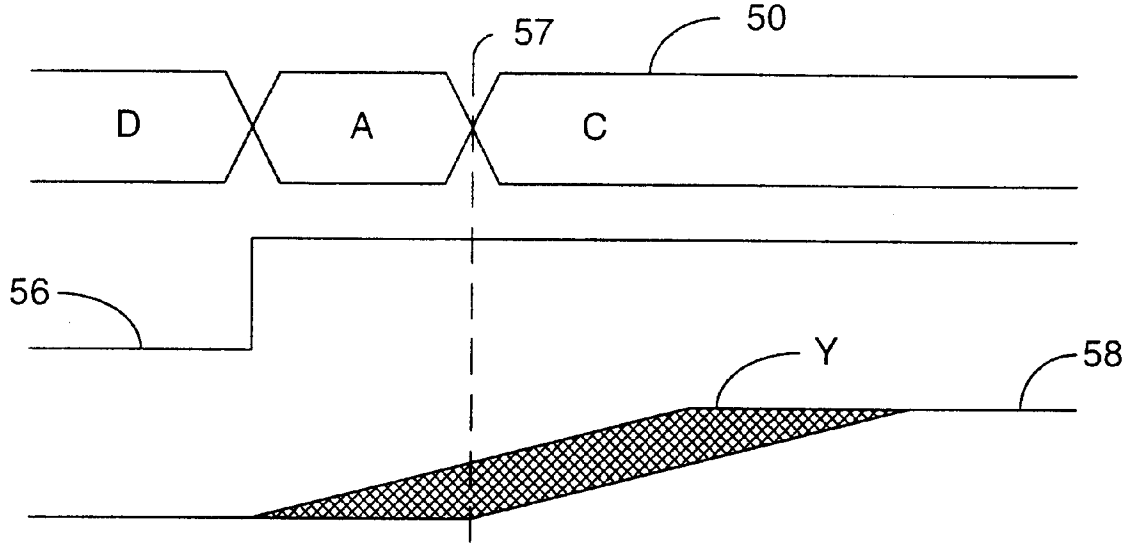
Figure 3b Prior Art
Figure 6A:
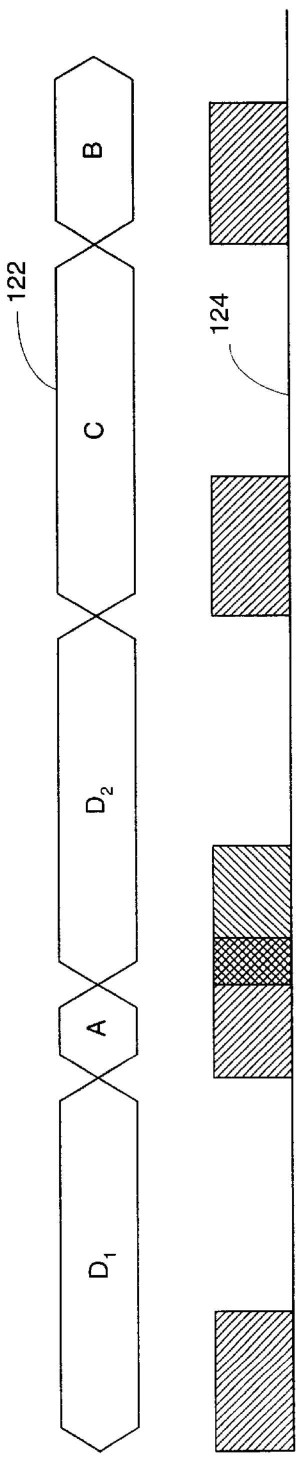
FIGS. 6*a–c* are timing diagrams illustrating the relationship in time between slots and light modulator transition periods throughout various operations in the method of the present invention.
Figure 6B:
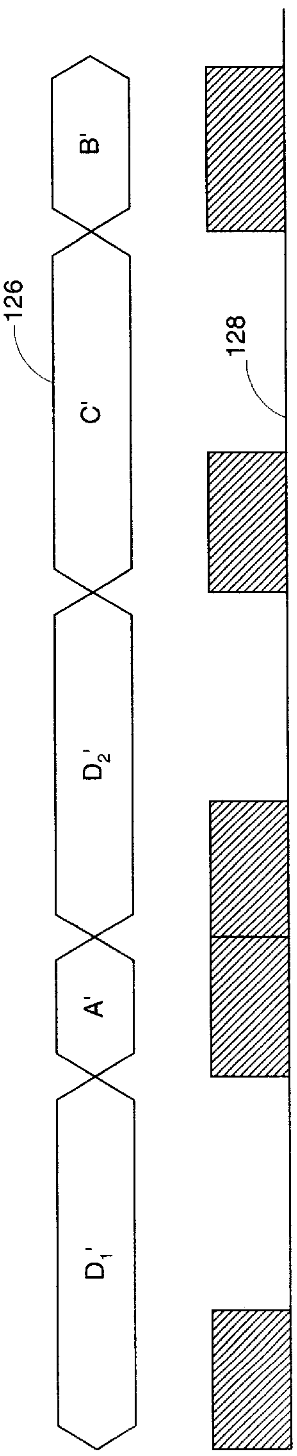
Figure 6C:
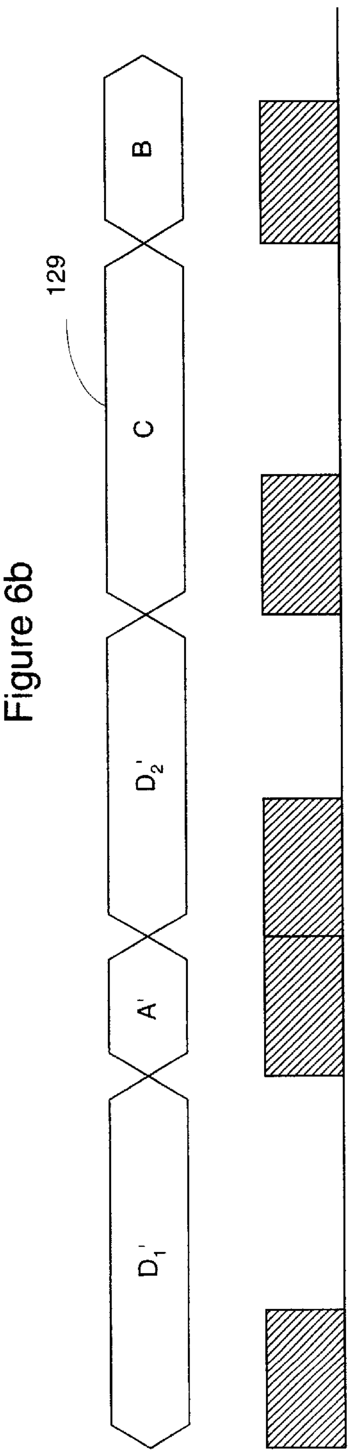

Referring now to FIGS. 6*a–c*, a method for improving the gray scale linearity in accordance with the present invention will be described. FIG. 6*a* includes a drive signal timing diagram 122 and a light modulator response timing diagram 124. In FIG. 6*a* the order in which the bits are displayed is altered from the order in timing diagram 110 of FIG. 5 by placing the slot corresponding to the LSB, A, within the slot corresponding to bit D, thus dividing the bit D slot into two slots, $D_1$ and $D_2$. Thus, the pixel displays the bit 1) value for a portion of the bit D slot time ($D_1$), then displays the bit A value for the bit A slot time, then displays the bit D value for the remainder ($D_2$) of the bit D slot time. Since bit $D_1$ will always have the same value (1 or 0 representing ON or OFF, respectively) as bit $D_2$, this has the effect of ensuring that the light modulator state immediately preceding and immediately following bit A will be identical, and thus the problem previously described with reference to FIGS. 3*a* and 3*b* will not occur. In other words, the time integral of the optical response due to bit A is not dependent on the value of the preceding and subsequent bits.

Next, as shown in drive signal timing diagram 126 of FIG. 6*b*, the duration of the bit A slot is increased or "stretched", creating slot A'. This increased duration of slot A' is established so as to cause the light modulator to produce the correct optical response for bit A. That is, the duration of slot A' is established such that the integral of the light modulator's response over the period of time that the light modulator is influenced by bit A equals the desired optical response for bit A. Methods for determining the amount of time by which to stretch deficient slots will be explained hereinafter.

Next, because the slot time associated with bit A has been increased, the duration of other slots must be reduced such that the new duration of all slots combined does not exceed the original duration of all slots combined. i.e., does not exceed the original frame time. Multiple methods for reducing the duration of the remaining slots are possible. One method is illustrated in timing diagram 126 of FIG. 6*b*. According to this method, the duration of each of slots B, C, $D_1$ and $D_2$ is proportionally reduced to compensate for the increased duration slot A'. This creates slots B', C', $D_1$' and $D_2$', which are shorter in duration than the original respective slots, although this is not entirely evident from FIG. 6*b* due to the scale of the figure. The amount of time by which slot A has been increased to create slot A' is divided among the remaining slots and reduces the duration of the respective slot, in this example, in the following proportions: B'—1/7th; C'—2/7th; $D_1$'—2/7th; and $D_2$'—2/7th.

As indicated in light modulator response timing diagram 128, all slots now have a duration greater than or equal to the light modulator response time. However, prior to reducing the slot duration for bits B and C, the light modulator produced the correct optical response for these bits. Reducing the duration of slots B and C correspondingly reduced the optical response associated with bits B and C. Therefore, while this method has the effect of improving somewhat the gray scale linearity over prior art methods, the solution is not ideal. The reason is that the optical response produced from the combined effects of slots $D_1$' and $D_2$' is not the same as the optical response from the original slot D in all cases. Further, the optical responses produced by slots B' and C' are also not the same as the optical responses produced from slots B and C, respectively. Thus, this method does not produce ideal gray scale linearity.

FIG. 6*c* illustrates a second method for compensating for the increased duration of slot A. As illustrated by timing diagram 129, in this method only the duration of slots $D_1$ and $D_2$ is reduced to compensate for increasing the duration of slot A, thus creating slots $D_1$' and $D_2$'. The amount of time by which the duration of slots $D_1$ and $D_2$ is reduced is determined such that the duration of slots A', $D_1$', and $D_2$' combined is equal to the duration of original slots A and D combined. Further, in this method the duration of slots B and C remains unchanged. This method of compensating for the increased duration of slot A results in substantially linear gray scale. FIG. 7 illustrates the reason that this method provides substantially the correct optical response for all gray scale levels.

Figure 7A:
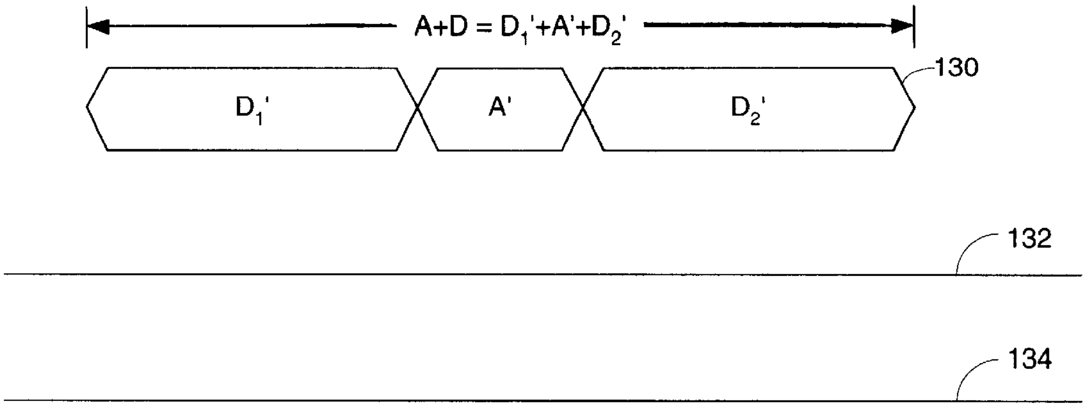
FIGS. 7*a–d* are timing diagrams illustrating the relationship between drive signal and light modulator time weighted optical response for the four possible combinations for the values of bits A and D arranged in time in one exemplary way according to the present invention.

Continuing to use the four-bit binary data scheme to represent gray scale levels, four combinations utilizing the values of bits A and D are possible. Further, because the present embodiment does not alter the duration of slots B and C, these four combination of bits A and D are the only relevant combinations. The combinations (for the case where B=C=0) are: A=0, D=0, for gray scale level 0; A=0, D=1, for gray scale level 8; A=1, D=0, for gray scale level 1; and A=1, D=1, for gray scale level 9. It should be noted that a specific bit always has the same value within that bit's slot, even if the slot is eventually partitioned into multiple subperiods or subslots. FIG. 7*a* includes timing diagram 130 that is also applicable to FIGS. 7*b*–*d*. As indicated, the drive signal duration of slots A+D is equal to the drive signal duration of slots A'+$D_1$'+$D_2$', both having a duration of 9 time periods, in this example.

FIG. 7*a* illustrates drive signal 132 and light modulator response 134 for A=0 and D=0, or gray scale level 0. In this case, the light modulator does not change states, and the integral of the light modulator response over the time period is 0. Because the values for bits A and D are both 0, this method produces the correct optical response for the A=0, D=0 case.

Figure 7B:
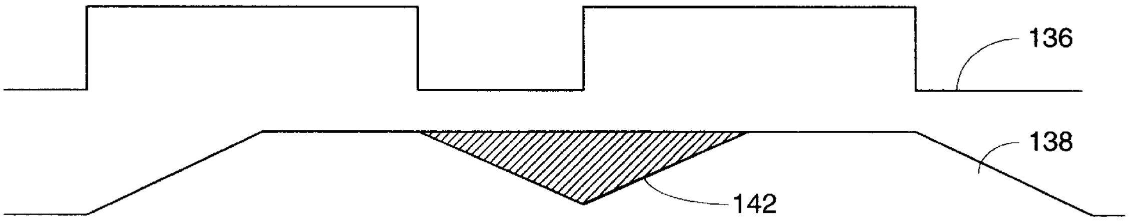

FIG. 7*b* illustrates drive signal 136 and light modulator response 138 for A=0 and D=1, or gray scale level 8. The combined duration of slots A', $D_1$', and $D_2$' would produce an optical response corresponding to a gray scale intensity of 9, if A=D=1, since bit slot A' has a time weight of 1 and slots $D_1$'+$D_2$' have a time weight of 8. However, region 142 represents the area influenced by bit A, corresponding to slot A'. The duration of slot A' has been established such that it produces the correct optical response. Thus, region 142 represents a time weighted optical response of 1. However, since region 142 represents A=0 or OFF, the time weighted value of the region 142 optical response (1) reduces the total optical response (9), and the remaining area has a value of 8 (9−1), the correct optical response for D=1, A=0.

Figure 7C:
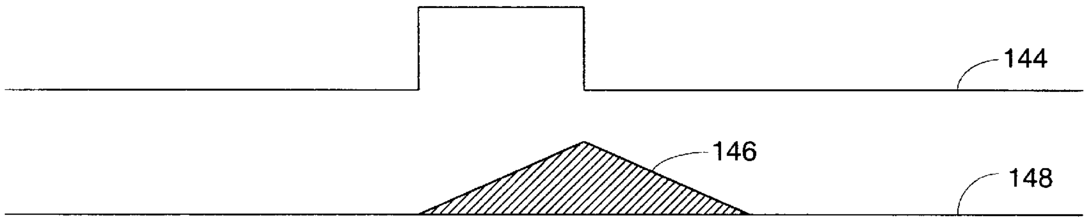

FIG. 7*c* illustrates the inverse of the FIG. 7*b* case. Here, as shown in drive signal 144, bit A has a value of 1 and bit D has a value of 0, representing gray scale level 1. Again, because the duration of slot A' has been determined and lengthened such that the correct optical response results, region 146 of light modulator response 148 represents a gray scale level of 1. Further, because the light modulator is in the OFF state for the remainder of the time, the correct optical response for gray scale level 1 results.

Figure 7D:
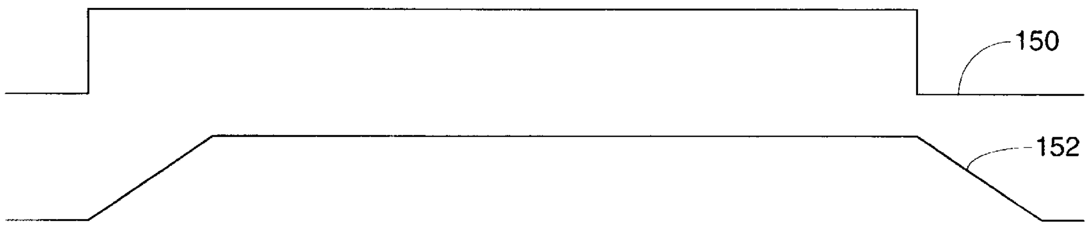

Finally, FIG. 7*d* illustrates the A=1, D=1 case, or gray scale level 9, as shown by drive signal 150. Further, as illustrated by light modulator response 152, the light modulator is always ON. Because the light modulator is always ON, the correct optical response for gray scale level 9 results.

Thus, the present embodiment produces the correct optical response for all possible combinations of bit A and D values. In the two cases where bits A and D have the same value, as described above with reference to FIGS. 7*a* and 7*d*, embedding the deficient slot, slot A, inside a larger, sufficient slot, slot D, eliminates all light modulator transitions associated with slot A, thus eliminating the effects of the non-zero response time. In the other two cases when bits A and D have different values, as discussed with reference to FIGS. 7*b* and 7*c*, the duration of the embedded slot is determined so as to either add or subtract a single unit of optical response, thus ensuring that the remaining units of optical response are due entirely to the effects of slot D.

Figure 8A:
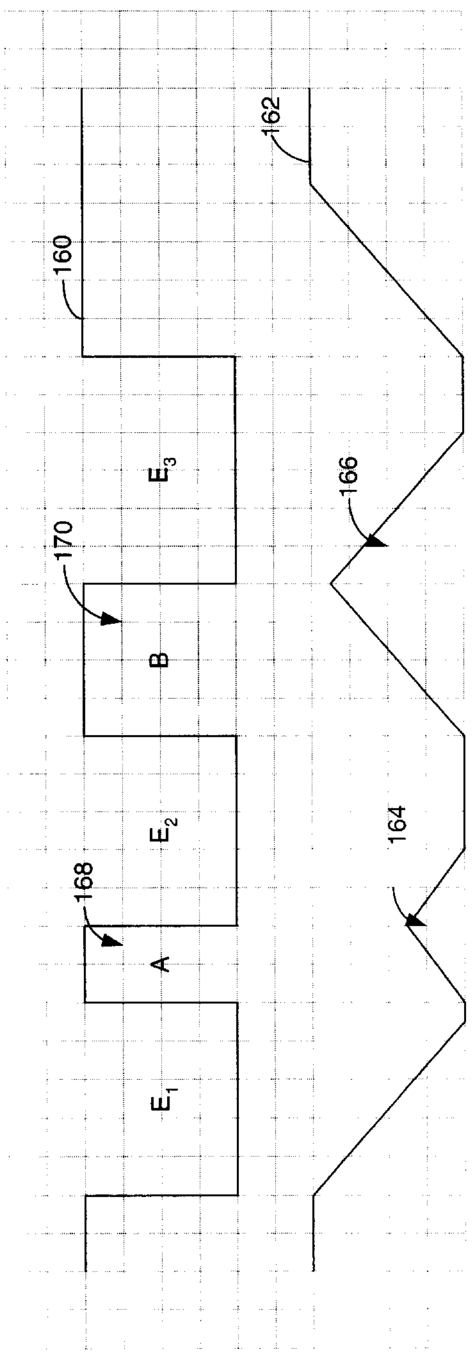
FIGS. 8*a* and 8*b* are timing diagrams illustrating another embodiment of the present invention.
Figure 8B:
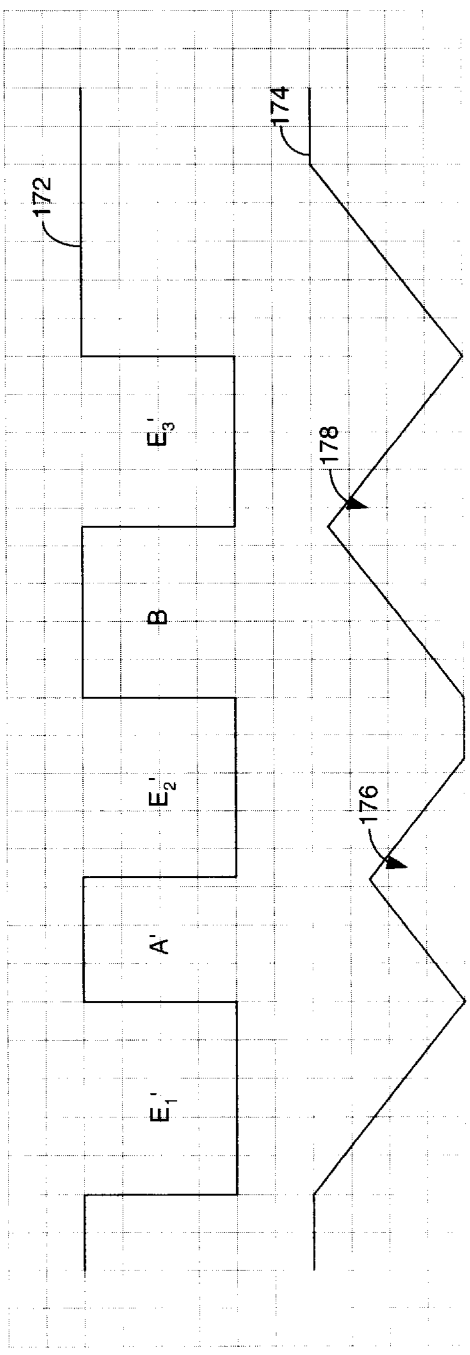

It should be noted that the aforedescribed method is not limited to four-bit gray scale binary display systems or even display systems. The method applies equally to binary display systems of any gray scale level. The method also applies equally to any multi-state (e.g., tertiary) light modulating systems where the light modulator has a finite, non-zero response time to change between states and one of the slots has duration shorter than the response time. Further, the present invention is not limited to systems wherein only one slot has duration shorter than the response time of the light modulator. Multiple slots with duration shorter than the response time of the light modulator may be embedded within bits having duration greater than the response time of the light modulator. Further, more than one bit with duration shorter than the response time of the light modulator may be embedded within a single bit having duration longer than the response time of the light modulator. An example of an embodiment wherein multiple slots are embedded within another slot is illustrated in FIGS. 8*a* and 8*b*. Further, the figures are illustrated on a unit square graph in order to show the relationships in the areas represented by the various bits before and after stretching.

FIGS. 8*a* and 8*b* illustrate an arrangement of slots in a multi-bit gray scale system wherein the slots associated with the two least significant bits (bits A and B) have duration shorter than the response time of the light modulator. In FIG. 8*a*, drive signal 160 indicates that slots A and B are both embedded within slot E, creating slots $E_1$, $E_2$ and $E_3$. Further, drive signal 160 also indicates that bits A and B each have a value of 1 and bit E has a value of 0. As indicated in the figure, slots A and B are deficient, since the areas under light modulator response 162 representing the light modulator's response to the bit A and bit B drive signals, regions 164 and 166, respectively, do not have the same area as regions 168 and 170. Thus, the time weighted response of the light modulator to drive signal 160 for bits A and B does not provide the correct optical response.

In FIG. 8*b* the duration of both slots A and B has been increased, as indicated by drive signal 172. In FIG. 8*b* the areas under light modulator response 174 representing the light modulator's response to the bit A and B drive signals, regions 176 and 178, respectively, now have the same areas as regions 168 and 170 from FIG. 8*a*. Thus, drive signal 172 causes the light modulator to produce the correct optical response for bits A and B.

Figure 9:
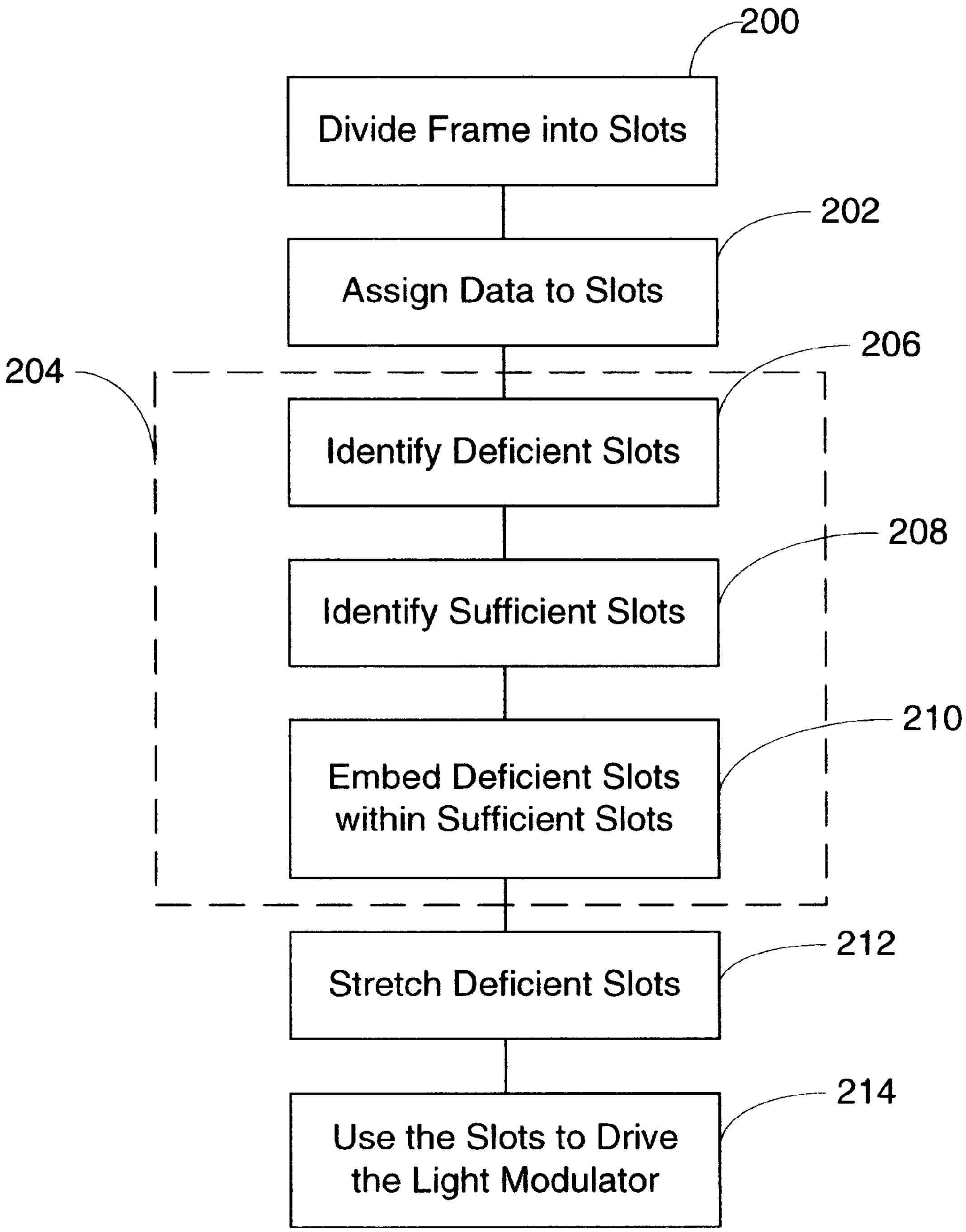
FIG. 9 is a flow chart illustrating the operations in the method of the present invention.

Having described the present embodiment generally, attention is now directed to FIG. 9 which illustrates the steps of the associated method. The method of FIG. 9 may be performed in any multi-state light modulating system that includes a light modulator that has a non-zero response time to change states. Such light modulating systems include, for example, liquid crystal display systems such as ferroelectric liquid crystal display systems and nematic liquid crystal display systems. Such light modulating systems could also include light emitting display systems such as plasma display systems. Other systems might include telecommunications systems or any other systems that utilize or produce modulated light outputs. The method begins at step 200 wherein the frame is divided into a plurality of subperiods or slots. The frame is the period over which the data are to be displayed so as to produce a certain optical response. For instance, in typical display systems, the frame is 1/60th of a second. If a binary system is used to represent the desired intensity, each slot typically varies in duration from the next shorter slot by a factor of two. Once the duration of each slot is established, the method proceeds to step 202.

At step 202, data are assigned to each slot. The data are assigned in relation to the duration of each slot such that the data represent a desired optical response, such as a desired intensity level.

Block 204 contains several steps that determine the order in which the slots are used to drive the light modulator. At step 206, slots that have duration shorter than the response time of the light modulator (deficient slots or deficient subperiods) are identified. As will be described below, the identification of deficient slots my be assisted by information relating to the temperature or optical response of the system. At step 208, slots that have duration longer than the response time of the light modulator (sufficient slots or sufficient subperiods) are identified. At step 210, the deficient slots are embedded within sufficient slots. The deficient slots are positioned in time relative to the sufficient slots such that some portion of the sufficient slot occurs on either side of the deficient slot. Further, the duration of the sufficient slot occurring in time both before and after the deficient slot must allow the light modulator to completely change states. That is, the deficient slots must be placed within sufficient slots such that each segment of a sufficient slot has duration at least as long as the response time of the light modulator.

At step 212, the embedded deficient slot(s) is/are stretched. Stretching entails increasing the duration of the embedded deficient slots an amount of time so as to produce the correct optical response. The correct optical response is the response that the light modulator would produce if the light modulator had an instantaneous response.

The amount of time by which the deficient slot(s) must be stretched may be determined in a number of ways. One method would use a servomechanism that senses the optical response of the light modulator for deficient slots. The servomechanism could include various means for measuring the modulator's optical response, including, for example, a photodetector that monitors the speed of the optical transitions, or an electrical sensor that detects the switching current associated with the light modulator's transitions. The duration of the deficient slot(s) would be increased until the servomechanism senses that the light modulator's response is correct. This process may occur at startup of the system or periodically during operation of the system. Other methods for determining the duration of the deficient slots are also possible. For example, in a liquid crystal display system, the system may include a temperature sensor that senses the temperature of the liquid crystal material. Because the liquid crystal's response time depends in a known way on the temperature of the liquid crystal, the amount of time by which the deficient slots must be stretched likewise depends on temperature.

Figure 10:
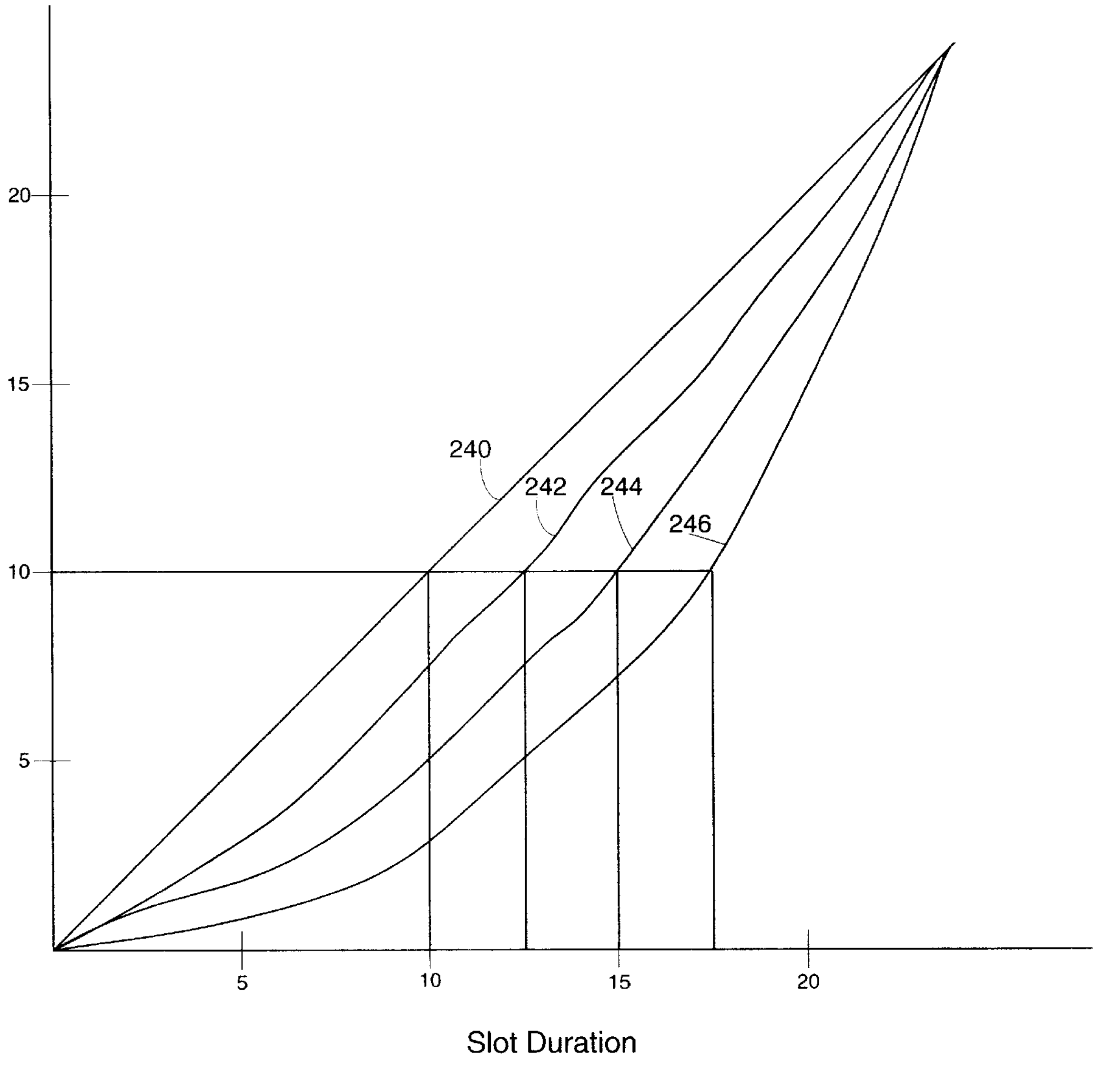
FIG. 10 is a graph illustrating the conceptual relationship between slot duration and optical response for an exemplary liquid material at several different temperatures.

FIG. 10 illustrates the relationship between a liquid crystal light modulator's optical response and the slot duration for an exemplary liquid crystal material at several different temperatures. For illustrative purposes, the graph is shown in generic units. The optical response for any given slot duration is the integral of the light output over the time period influenced by the slot (i.e., including both the rise and fall regions of the optical response). Line 240 indicates the desired optical response for any particular slot duration. Each of curves 242, 244 and 246 indicate the actual optical response for different temperatures. For lower temperatures (e.g., curve 246), the liquid crystal material switches slower; therefore, the optical response is smaller for lower temperatures, assuming a constant slot duration. However, for each temperature, there exists a slot duration that would provide the desired optical response. For example, to obtain an optical response of 10 units would require a pulse width of approximately 12.5 units at the temperature represented by curve 242, approximately 15 units at the temperature represented by curve 244 and approximately 17.5 units at the temperature represented by curve 246. Thus, once the temperature of the liquid crystal material is known, the slot duration required to produce a desired optical response may be obtained from the temperature/optical response curve.

Returning to step 212 of FIG. 9, one method to determine the amount of time by which to stretch a given slot in a liquid crystal system (or any system having a response time that depends on temperature) includes storing the temperature/optical response information in a look-up table. The temperature of the system is measured, the look-up table is consulted to determine the slot duration required to obtain a desired optical response, and the slot duration is altered accordingly.

As previously discussed with reference to FIGS. 7*a*–*d*, stretching an embedded deficient slot may entail, but does not require, altering the duration of all other slots. Only the duration of the embedded slot and the slot within which the deficient slot is embedded must be altered. Therefore, once the duration of the deficient slot is determined, the duration of the slot within which the deficient slot is embedded is determined such that their combined duration remains the same after stretching. However, the requirements discussed with reference to step 210 above must continue to be satisfied after stretching the deficient slot. That is, each segment of the divided sufficient slot must have duration at least as long as the response time of the light modulator.

At step 214, the reordered data are used to drive the light modulator. Each bit of data is provided to the light modulator, typically through a controller, so as to cause the light modulator to provide a desired optical response over a specified time period.

The order in which the preceding steps were presented is not necessarily the order in which the steps must be performed. For example, data are not necessarily assigned to the slots prior to determining the order in which the slots are used to drive the light modulator. The order of the slots may be determined at the time the system is designed, as would be the case if the system is configured to respond to a pre-programmed instruction set. In such case, the order may be determined using the worst case situation within the device's operating range (i.e., the situation wherein the largest number of slots are deficient). Further, although the order of the slots may be pre-programmed, the duration of each slot may be determined when the system is operated. An example of such a system would be a liquid crystal display system, as explained above. In a liquid crystal display system, the response time of the liquid crystal material depends on the temperature of the material. Therefore, the system may be configured to sense the temperature of the liquid crystal material and adjust the duration of the slots such that the correct optical response results for the sensed temperature. The temperature sensing operation may take place only when the system begins operation, or periodically as the system operates. In such a system, once the order and duration of the slots is established, data may be continuously provided to successive frames without the need to readjust the duration or order of the slots. In other words, the method does not depend on the data assigned to the slots.

Although only certain specific embodiments of the present invention have been described in detail, it should be understood that the present invention may be embodied in many other specific forms without departing from the spirit or scope of the invention. For example, although the response time transitions have been described and illustrated as having constant slope, this is not a requirement. In the examples and illustrations certain higher order effects and transients that may be present were not illustrated in order not to obscure the invention. Further, although the rise and fall transitions have been illustrated as being symmetrical, this is also not a requirement. The present invention may improve the gray scale linearity in systems having rise transitions that are not symmetrical to fall transitions; however, the present invention is most effective in systems having symmetrical rise and fall transitions. Therefore, the present examples are to be considered as illustrative and not restrictive, and the invention is not to be limited to the details given herein, but may be modified within the scope of the appended claims.

What is claimed is:

1. A method of operating a light modulator including:

providing a light modulator having grayscale based on a series of time intervals, the light modulator having a plurality of light modulator states;

establishing the duration of each time interval such that the time intervals in the series have progressively varying duration;

determining a drive signal for each time interval that causes the light modulator to assume a specific light modulator state; and causing the light modulator to produce a desired time-averaged light level over the series of time intervals by in part driving the light modulator using the drive signal that corresponds to a particular time interval for a duration that is longer than the duration of the particular time interval, the particular time interval having duration shorter than the response time of the light modulator.

2. A method as defined in claim 1, further including:

arranging the series of time intervals such that the light modulator is in the same state immediately prior to the particular time interval as the light modulator is in immediately after the particular time interval.

3. A method as defined in claim 1, further including:

arranging the time intervals such that the particular time interval immediately follows a first part of a longer one of the time intervals and immediately precedes a second part of the longer time interval.

4. A method of operating a light modulator including:

providing a light modulator having grayscale based on a series of time intervals, the light modulator having a plurality of light modulator states;

establishing the duration of each time interval such that the time intervals in the series have progressively varying duration;

determining a drive signal for each time interval that causes the light modulator to assume a specific light modulator state;

causing the light modulator to produce a desired time-averaged light level over the series of time intervals by in part driving the light modulator using the drive signal that corresponds to a particular time interval for a duration that is longer than the duration of the particular time interval, the particular time interval having duration shorter than the response time of the light modulator;

sensing the temperature of the light modulator; and determining the duration by which the drive signal corresponding to the particular time interval exceeds the duration of the particular time interval based in part on the sensed temperature.

5. A method of operating a light modulator including:

providing a light modulator having grayscale based on a series of time intervals, the light modulator having a plurality of light modulator states;

establishing the duration of each time interval such that the time intervals in the series have progressively varying duration;

determining a drive signal for each time interval that causes the light modulator to assume a specific light modulator state; and causing the light modulator to produce a desired time-averaged light level over the series of time intervals by in part arranging the series of time intervals such that the light modulator is in the same state immediately prior to a particular time interval as the light modulator is in immediately after the particular time interval, the particular time interval having duration shorter than the response time of the light modulator.

6. A method of operating a light modulator including:

providing a light modulator having grayscale based on a series of time intervals, the light modulator having a plurality of light modulator states;

establishing the duration of each time interval such that the time intervals in the series have progressively varying duration;

determining a drive signal for each time interval that causes the light modulator to assume a specific light modulator state; and causing the light modulator to produce a desired time-averaged light level over the series of time intervals by in part arranging the time intervals such that a particular time interval immediately follows a first part of a longer one of the time intervals and immediately precedes a second part of the longer time interval, the particular time interval having duration shorter than the response time of the light modulator.

7. A method of operating a light modulator including:

providing a light modulator having grayscale based on a series of time intervals, the light modulator having a plurality of light modulator states;

establishing the duration of each time interval such that the time intervals in the series have progressively varying duration;

determining a drive signal for each time interval that causes the light modulator to assume a specific light modulator state;

arranging the time intervals such that a particular time interval immediately follows a first part of a longer one of the time intervals and immediately precedes a second part of the longer time interval, the particular time interval having duration shorter than the response time of the light modulator;

causing the light modulator to produce a desired time-averaged light level over the series of time intervals by in part driving the light modulator using the drive signal that corresponds to the particular time interval for a duration that is longer than the duration of the particular time interval; and reducing the duration of the drive signal corresponding to the longer time interval by an amount of time that is related to the amount of time by which the drive signal corresponding to the particular time interval exceeds the duration of the particular time interval.

8. The A method of operating a light modulator including:

providing a light modulator having grayscale based on a series of time intervals, the light modulator having a plurality of light modulator states;

establishing the duration of each time interval such that the time intervals in the series have progressively varying duration;

determining a drive signal for each time interval that causes the light modulator to assume a specific light modulator state;

arranging the time intervals such that a particular time interval immediately follows a first part of a longer one of the time intervals and immediately precedes a second part of the longer time interval, the particular time interval having duration longer than the response time of the light modulator;

causing the light modulator to produce a desired time-averaged light level over the series of time intervals by in part driving the light modulator using the drive signal that corresponds to the particular time interval for a duration that is longer than the duration of the particular time interval;

reducing the duration of the drive signal corresponding to the longer time interval by an amount of time that is related to the amount of time by which the drive signal corresponding to the particular time interval exceeds the duration of the particular time interval;

sensing the temperature of the light modulator; and determining the duration by which the drive signal corresponding to the particular time interval exceeds the duration of the particular time interval based in part on the sensed temperature.

9. A light modulator system having grayscale based on a series of time intervals, the light modulator system having a plurality of light modulation states, the time intervals having progressively varying duration, each time interval having an associated drive signal that causes the light modulator system to assume a specific light modulation state, the light modulator system comprising:

a light modulator; and a controller that causes the light modulator to produce a desired time-averaged light level over the series of time intervals by in part driving the light modulator using the drive signal that corresponds to a particular time interval for a duration that is longer than the duration of the particular time interval, the particular time interval having duration shorter than the response time of the light modulator.

10. A light modulator system as defined in claim 9, wherein the light modulator is a micro-mechanical deformable mirror device.

11. A light modulator system as defined in claim 9, further comprising:

means for arranging the series of time intervals such that the light modulator is in the same state immediately prior to the particular time interval as the light modulator is in immediately after the particular time interval.

12. A light modulator system as defined in claim 9, further comprising:

means for arranging the time intervals such that the particular time interval immediately follows a first part of a longer one of the time intervals and immediately precedes a second part of the longer time interval.

13. A light modulator system as defined in claim 9, wherein the light modulator is a ferroelectric liquid crystal display.

14. A light modulator system as defined in claim 9, wherein the light modulator is a nematic liquid crystal display.

15. A light modulator system as defined in claim 9, wherein the light modulator is a plasma display.

16. A light modulator system having grayscale based on a series of time intervals, the light modulator system having a plurality of light modulation states, the time intervals having progressively varying duration, each time interval having an associated drive signal that causes the light modulator system to assume a specific light modulation state, the light modulator system comprising:

a light modulator;

a controller that causes the light modulator to produce a desired time-averaged light level over the series of time intervals by in part driving the light modulator using the drive signal that corresponds to a particular time interval for a duration that is longer than the duration of the particular time interval, the particular time interval having duration shorter than the response time of the light modulator;

a first arrangement that senses the temperature of the light modulator; and a second arrangement responsive to the first arrangement that determines the duration by which the drive signal corresponding to the particular time interval exceeds the duration of the particular time interval based in part on the sensed temperature.

17. A light modulator having grayscale based on a series of time intervals, the light modulator having a plurality of light modulator states, the time intervals having progressively varying duration, each time interval having an associated drive signal that causes the light modulator to assume a specific light modulator state, the light modulator comprising:

a controller that causes the light modulator to produce a desired light level over the series of time intervals by in part arranging the series of time intervals such that the light modulator is in the same state immediately prior to a particular time interval as the light modulator is in immediately after the particular time interval, the particular time interval having duration shorter than the response time of the light modulator.

18. A light modulator having grayscale based on a series of time intervals, the light modulator having a plurality of light modulator states, the time intervals having progressively varying duration, each time interval having an associated drive signal that causes the light modulator to assume a specific light modulator state, the light modulator comprising:

a controller that causes the light modulator to produce a desired light level over the series of time intervals by in part arranging the time intervals such that a particular time interval immediately follows a first part of a longer one of the time intervals and immediately precedes a second part of the longer time interval, the particular time interval having duration shorter than the response time of the light modulator.

19. A light modulator having grayscale based on a series of time intervals, the light modulator having a plurality of light modulator states, the time intervals having progressively varying duration, each time interval having an associated drive signal that causes the light modulator to assume a specific light modulator state, the light modulator comprising:

a controller that:

1) arranges the time intervals such that a particular time interval immediately follows a first part of a longer one of the time intervals and immediately precedes a second part of the longer time interval, the particular time interval having duration shorter than the response time of the light modulator;

2) causes the light modulator to produce a desired light level over the series of time intervals by in part driving the light modulator using the drive signal that corresponds to the particular time interval for a duration that is longer than the duration of the particular time interval; and 3) reduces the duration of the drive signal corresponding to the longer time interval by an amount of time that is related to the amount of time by which the drive signal corresponding to the particular time interval exceeds the duration of the particular time interval.

20. A light modulator having grayscale based on a series of time intervals, the light modulator having a plurality of light modulator states, the time intervals having progressively varying duration, each time interval having an associated drive signal that causes the light modulator to assume a specific light modulator state the light modulator comprising:

a controller that:

1) arranges the time intervals such that a particular time interval immediately follows a first part of a longer one of the time intervals and immediately precedes a second part of the longer time interval, the particular time interval having duration shorter than the response time of the light modulator;

2) causes the light modulator to produce a desired light level over the series of time intervals by in part driving the light modulator using the drive signal that corresponds to the particular time interval for a duration that is longer than the duration of the particular time interval; and 3) reduces the duration of the drive signal corresponding to the longer time interval by an amount of time that is related to the amount of time by which the drive signal corresponding to the particular time interval exceeds the duration of the particular time interval;

a first arrangement that senses the temperature of the light modulator; and a second arrangement responsive to the first arrangement that determines the duration by which the drive signal corresponding to the particular time interval exceeds the duration of the particular time interval based in part on the sensed temperature.

* * * * *